United States Patent
Huitema et al.

(10) Patent No.: US 10,128,987 B2
(45) Date of Patent: Nov. 13, 2018

(54) SCALABLE RECEIVE WINDOW AUTO-TUNING

(71) Applicant: Microsoft Technology Licensing, LLC, Redmond, WA (US)

(72) Inventors: Christian F. Huitema, Clyde Hill, WA (US); Praveen Balasubramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 15/288,554

(22) Filed: Oct. 7, 2016

(65) Prior Publication Data

US 2018/0076934 A1    Mar. 15, 2018

Related U.S. Application Data

(60) Provisional application No. 62/395,324, filed on Sep. 15, 2016.

(51) Int. Cl.
*H04L 1/18* (2006.01)
*H04L 12/861* (2013.01)

(52) U.S. Cl.
CPC .......... *H04L 1/1835* (2013.01); *H04L 1/1832* (2013.01); *H04L 49/9005* (2013.01)

(58) Field of Classification Search
CPC ......... H04W 52/0216; H04W 74/0808; H04W 84/18; Y02D 70/00; Y02D 70/144
See application file for complete search history.

(56) References Cited

U.S. PATENT DOCUMENTS

| | | | |
|---|---|---|---|
| 5,063,562 A | 11/1991 | Barzilai et al. | |
| 6,415,410 B1 | 7/2002 | Kanerva et al. | |
| 7,283,474 B1 | 10/2007 | Bergenwall | |
| 7,380,006 B2 | 5/2008 | Srinivas et al. | |
| 8,150,995 B2 | 4/2012 | Weston et al. | |
| 8,340,099 B2 | 12/2012 | Black et al. | |
| 8,385,301 B2* | 2/2013 | Lee ................... | H04W 52/0216 370/338 |
| 8,705,357 B2 | 4/2014 | Torres et al. | |
| 9,210,060 B2 | 12/2015 | Ayandeh et al. | |
| 9,270,609 B2 | 2/2016 | Adiraju et al. | |
| 2014/0304320 A1 | 10/2014 | Taneja et al. | |

OTHER PUBLICATIONS

Fisk, et al., "Dynamic Adjustment of TCP Window Sizes", In Technical Report of LAUR 00-3321, Jul. 2000, pp. 1-11.
Davies, Joseph, "The Cable Guy: TCP Receive Window Auto-Tuning", Published on: Jan. 2007, 5 pages Available at: https://technet.microsoft.com/en-us/magazine/c4e1a179-fe58-424e-ad00-4dd2d8fc34a2.

(Continued)

*Primary Examiner* — Chandrahas B Patel

(57) ABSTRACT

Examples of the disclosure dynamically scale receive window auto-tuning. Tuning data is obtained, including the number of bytes in a receive buffer and the distribution of receive packets over time. Aspects of the disclosure use this tuning data to determine rates at which one or more applications on the receiving computer are consuming data and adjust or maintain the receive buffer accordingly in a dynamic manner to scale a receive window to current conditions.

20 Claims, 7 Drawing Sheets

(56) References Cited

OTHER PUBLICATIONS

"TCP Window Size Adjustment and Flow Control", Published on: Sep. 7, 2004, 1 page Available at: http://www.tcpipguide.com/free/t_TCPWindowSizeAdjustmentandFlowControl.htm.
Xu, et al., "Binary increase congestion control (BIC) for fast long-distance networks", In Proceedings of Twenty-third AnnualJoint Conference of the IEEE Computer and Communications Societies, vol. 4, Mar. 7, 2004, 11 pages.

\* cited by examiner

SCALABLE RECEIVE WINDOW AUTO-TUNING

CLAIM OF PRIORITY

This application claims the benefit of U.S. Provisional Patent Application Ser. No. 62/395,324, entitled "Scalable Receive Window Auto-Tuning" and filed on Sep. 15, 2016, which is incorporated herein by reference in its entirety for all intents and purposes.

BACKGROUND

Computers communicating over a network are often categorized as sending computers and receiving computers, where a sending computer may send data to a receiving computer over a network connection. In some circumstances, sending and receiving computers may have different processing speeds or resources for transmitting and consuming data. A receiving computer may store received data in a receive buffer temporarily until an application processes the data.

Protocols, such as the Transmission Control Protocol (TCP) for example, define a receive window for the receiving computer, which is the maximum amount of data that the sending computer is allowed to send to the receiving computer before receipt of at least some of the data is acknowledged. The receive window may limit the amount of data (e.g., defined in bytes) that the sending computer may have outstanding (i.e., unacknowledged) to the receiving computer at any given time. Once the sending computer sends the maximum amount of data, the sending computer may not be allowed to send more data until it receives an acknowledgement that at least some of the data has been received.

Some operating systems provide receive windows that are statically-configured and require a manual change the size of the receive window. Other operating systems provide adaptive tuning receive windows, such as dynamic rightsizing, which may increase the receive window size in predetermined increments based on estimates. However, these systems suffer from inaccurate estimates leading to suboptimal receive window sizes, thereby negatively affecting performance of the network connection.

SUMMARY

Examples of the disclosure provide a system and method for dynamically scaling receive window auto-tuning. Two tuning signals include the number of bytes in the receive queue of a receive buffer and the distribution of receive packets over time. Aspects of the disclosure use these two tuning signals to determine rates at which one or more applications on the receiving computer are consuming data, and to adjust or maintain the receive buffer accordingly in a dynamic manner to scale to current conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
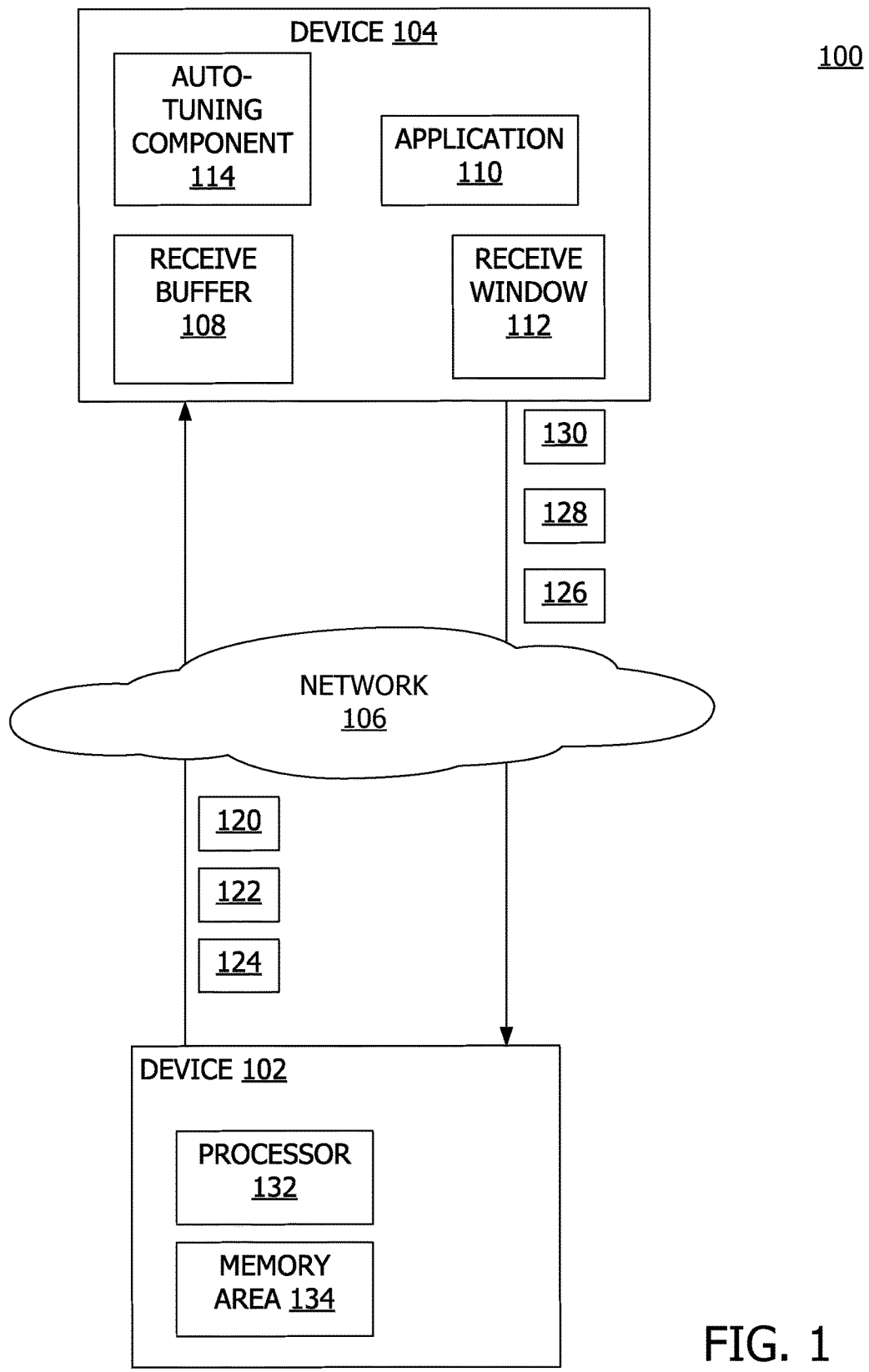
FIG. 1 is an exemplary block diagram illustrating a scalable auto-tuning network environment.

Referring to the figures, examples of the disclosure enable dynamic scalable auto-tuning of a receive buffer (or receive window queue) for a receiving computer based on current conditions. A scalable auto-tuning component monitors the receive buffer for a network connection, and identifies a size of the receive buffer over a time interval as well as a number of bytes received per time slice of the time interval. An analysis of the identified size of the buffer and the number of received bytes leads to a determination of whether to adjust a receive buffer to scale for current data transmission and/or consumption conditions.

As a device communicates with another device over a network, different connections may have different connection parameters, and the connection parameters may change over time. For example, some devices may communicate with other devices that are located in a variety of different geographical locations. Data transmission may take longer to a distant location than to a local location, and the propagation time of data may change over time. As another example, the bandwidth available for the connection may change depending on a number of factors, e.g., the number of applications used on the device, the amount of bandwidth available on the network and the speed with which an application can process data that is received at the device.

A receive window that is sized appropriately in some circumstances may not be sized appropriately in other circumstances. For example, a receive window that is too small may cause the network to be under-utilized. A receive window that is too large may increase network congestion, overwhelm the receiving device, and generally degrade network performance. Additionally, security issues arise in scenarios where a receiving device is overwhelmed by data from a sending device, such as the receiving device running out of memory. A sending device (sender) may send data to a receiving device (receiver). As used herein, data may be used interchangeable with packet or bytes. As an example, a sender may send a packet, the receiver may receive the packet, and the receiver may send an acknowledgement signal (ACK) that acknowledges receipt of the packet back to the sender. The sender may then receive the ACK. There may be a delay between the time the sender sends the packet and the time the sender receives the ACK. This delay may be called the round trip time (RTT).

A receiver has a receive buffer and a receive window. A receive buffer (rcvBuf) is the actual memory allocation in the kernel of the receiving device to hold the data until the application consumes the data. A receive window (rcvWnd) is the memory allocation that the receiving device advertises in the ACK packets to the sender. The receive window may vary corresponding to the amount of data queued up in the receive buffer awaiting consumption by the application. In other words, rcvWnd=rcvBuf allocation size—(data already queued in rcvBuf). When the receive buffer does not grow and data continues to be queued, the receive window is reduced. For optimal performance, aspects of the disclosure provide for increasing the receive buffer allocation size, and hence the receive window advertised, in accordance with what the sender and receiver are able to maintain in a dynamic, scalable manner.

In some examples, such as with a Transmission Control Protocol (TCP), a "receive window" parameter of a TCP connection is computed. This is useful for many network connections, including high speed or long delay connections. Some existing TCP receive window auto-tuning algorithms try to find a receive window value that is large enough to not slow the connection, but also small enough to not create excessive buffer demand. However, it does not succeed in every situation. For example, the existing algorithms depend on correct estimates of both the bandwidth and RTT for the connection. The RTT estimate can often be incorrect, such as in "receive only" connections. For example, there may be a feedback loop between the bandwidth estimation and the receive window estimate, which may lead to indeterminate results.

Aspects of the present disclosure consider three factors in determining whether to adjust a receive window buffer: reduce the receive window if the application is struggling to process the data; maintain the receive window if the application is not consuming data faster than it is received; and increase the receive window in the other scenarios. Compared to some existing auto-tuning logic, which are heavily dependent on the estimates of bandwidth and RTT, the present disclosure uses two measured tuning signals or tuning data: the number of bytes in the receive buffer (or queue) and the distribution of receive packets over time. This places a greater emphasis on not slowing the connection, and a lower priority on keeping the number of packets in transit as small as possible.

For some operating systems, the limits on the number of packets in transit may be set by the congestion control algorithm running at the sender, and may also be guided by Active Queue Management algorithms (AQM) running on intermediate routers. However, other operating systems, such as Linux® servers, use aggressive congestion control algorithms. With such algorithms, the congestion window can grow to a large size, and this may cause problem in low delay environments when the switches have low memory. As such, it is desirable to avoid growing the window more than necessary.

Examples of the present disclosure rely on two factors to automatically and scalably tune the TCP receive window: (1) a measure of the size of the receive buffer over a time interval and (2) the distribution and amount of data received over subintervals ("slices") of the time interval. Aspects of the disclosure combine these two factors to determine how to adjust the size of the receive window. In particular, aspects of the disclosure analyze these two factors in rounds to determine whether to adjust the size of the receive window. The determination is biased towards rapidly increasing the size of the receive window when an increase is warranted, and cautiously decreasing the size of the receive window when a decrease is warranted.

Aspects of the disclosure further enable increased computer performance and efficiency at least because the scalable auto-tuning of the receive window dynamically adapts to current data transmission and data consumption conditions, alleviating bottlenecks and providing more efficient use of resources. By dynamically scaling receive window auto-tuning as described in this disclosure, some examples reduce processing load and/or increase processing speed by strategically managing computational, processing, memory, and/or other resources. The effect of identifying receive window conditions and dynamically scaling for data transmission and data consumption rates improves performance of the application as well as of the device hosting the application. Additionally, some examples may conserve memory, reduce network bandwidth usage, improve operating system resource allocation, and/or improve communication between computing devices by streamlining at least some operations, such as data storage and data access, by automating at least some operations.

Referring again to FIG. 1, an exemplary block diagram illustrating a scalable auto-tuning network environment as provided by aspects of this disclosure. The illustrative environment includes two computing devices, device 102 and device 104, communicatively coupled to a network 106. Device 102 and device 104 may be any suitable computing environment, such as a general-purpose computer system described in further detail below, and may communicate by sending packets of data according to any suitable protocol, such as TCP/IP. However, packet-switched networks and related protocols need not necessarily be used. Any other suitable network may be used, such as a telephone network. The invention is not limited to any particular type of network or protocol.

A computing device represents any device executing instructions (e.g., as application programs, operating system functionality, or both) to implement the operations and functionality as described herein. The computing device may include a mobile computing device, an embedded computing device, or any other portable device. In some examples, the mobile computing device includes a mobile telephone, laptop, tablet, computing pad, netbook, gaming device, wearable device, and/or portable media player. The computing device may also include less portable devices such as desktop personal computers, kiosks, tabletop devices, industrial control devices, wireless charging stations, electric automobile charging stations, appliances, home automation components, or any other embedded devices.

In some examples, a computing device has at least one processor and a memory area, and optionally at least one user interface. The processor may include any quantity of processing units, and may be programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIGS. 3 and 4).

In some examples, the processor represents an implementation of analog techniques to perform the operations described herein. For example, the operations may be performed by an analog computing device and/or a digital computing device.

The computing device further may include one or more computer readable media such as the memory area. The memory area includes any quantity of media associated with or accessible by the computing device. The memory area may be internal to the computing device, external to the computing device, or both (not shown). In some examples, the memory area includes read-only memory and/or memory wired into an analog computing device.

The memory area stores, among other data, one or more applications. The applications, when executed by the processor, operate to perform functionality on the computing device. The applications may communicate with counterpart applications or services such as web services accessible via a network. For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. The memory area may store data locally, may store data access points associated with data stored remote from the computing device, or any combination of local and remote data.

The memory area further stores one or more computer-executable components. Exemplary components may include a user interface component. A computer-executable component, when executed by the processor of the computing device, cause the processor to perform operations.

In this example, device 102 may be a sender, or sending device, that sends data (e.g., packets 120, 122 and 124) to device 104 via network 106. Device 104 may be a receiver, or receiving device, that receives packets 120, 122 and 124 from device 102. Once device 104 receives a packet, it may store the packet in a receive buffer 108, and send an acknowledgement signal (ACK) to device 102. The ACK may indicate to device 102 that the packet was received by device 104. For example, ACK 126 may indicate that packet 120 was received; ACK 128 may indicate that packet 122 was received and ACK 126 may indicate that packet 124 was received. The ACK may also provide, or advertise, a current measure of receive window 112 for device 104.

A receive buffer may be a storage mechanism (e.g., a computer-readable medium) that may store received packets until they may be processed by device 104. A receive buffer may have any suitable size. Once data is stored in the receive buffer, an application 110 may retrieve the data from the receive buffer 108 and process it. Device 104 may have a receive window 112 that it advertises to device 102. As one illustrative example, receive window 112 may have a relatively small receive window size: a receive window size only large enough to accept three packets from device 102. Device 104 may advertise the receive window 112 to device 102 indicating that device 102 may have three packets outstanding at any given time, in this example.

Device 102 may begin sending packets to device 104, sending packets 120, 122 and 124. Once the third packet, packet 124 in this example, has been sent, device 102 may stop sending packets because it has three packets outstanding and has not yet received an ACK from device 104. At some point in time, packet 120 may be received by device 104 and ACK 126 may be sent to device 102. Once device 102 receives ACK 126, it now has only two packets outstanding (packets 122 and 124), and may send another packet to device 104. This example receive window size is provided to illustrate the operation of a receive window and does not limit the scope of this disclosure in any way. Larger or smaller receive windows may be used. Additionally, a receive window may have a size that is defined in any suitable way, such as bits, bytes, packets, or any other suitable unit of data. Furthermore, any suitable type of data may be sent. Data may be sent in any suitable format such as packets, datagrams, a stream of bits, an analog signal, or any other suitable format.

Auto-tuning component 114 may monitor receive buffer 108 of device 104. In particular, auto-tuning component 114 may identify a size of receive buffer 108 over an interval of time. The size of a receive buffer may refer to the memory allocation for data storage at a receiving device. Receive buffer 108 may queue or store data or packets received from a sending device, such as device 102, for an application of the receiving device, such as application 110. Receive window 112 is an advertised memory allocation provided to sending devices, such as device 102, by device 104. In some examples, receive window 112 is advertised in ACKs sent by device 104, such as ACK 126, ACK 128, and ACK 130. Receive window 112 may vary at any given time based on the number of packets, or amount of data, stored or queued in receive buffer 108 and awaiting consumption by application 110.

As data stored in receive buffer 108 is consumed by application 110, and the queue or store of data packets decreases, receive window 112 may increase in size, in some examples. As data is received by device 104 from device 102, and stored until application 110 consumes the data, receive window 112 may decrease in size. In this way, receive buffer 108 and receive window 112 may have varying minimum and maximum sizes over a time interval, depending on the rate of data transmission by a sending device and the rate of data consumption by an application of the receiving device.

In some examples, receive window 112 may be changed over time by auto-tuning component 114. For example, a new receive window size may be provided, or advertised to sending devices, as a function of the dynamic scalable tuning of receive buffer 108 by auto-tuning component 114. In some examples, a scaling factor may be used by auto-tuning component 114 based on one or more tuning signals or tuning data obtained, such as a size of receive buffer 108 over a time interval, or over multiple time intervals, and a rate of data distribution over a time interval, or over multiple time intervals, for receive buffer 108.

Figure 2:
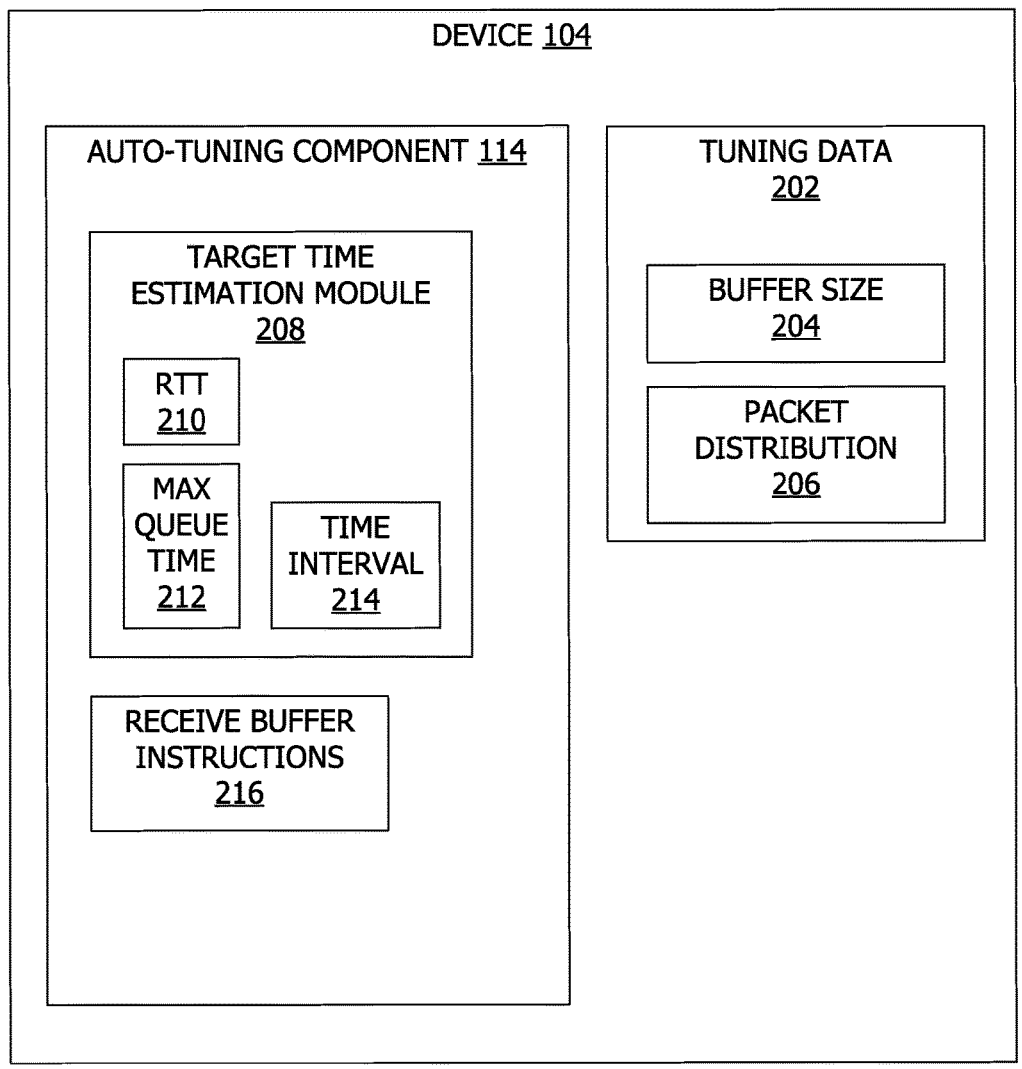
FIG. 2 is an exemplary block diagram illustrating a receiving device implementing a scalable auto-tuning component.

FIG. 2 is an exemplary block diagram illustrating a receive device for scalable receive window auto-tuning, such as device 104. Scalable auto-tuning component 114 obtains or receives tuning data 202. Tuning data 202 may include, without limitation, buffer size 204 and packet distribution 206. Buffer size 204 may refer to a receive buffer size. Packet distribution 206 may refer to a rate of data distribution for a receive buffer over a time interval, or over multiple intervals of time.

The buffer size and bytes per sliced variables, or packet distribution, is observed over a time interval, which is selected or calculated by scalable auto-tuning component 114. In practice, instead of a fixed interval, the time needed to receive the total number of bytes advertised in a receive buffer is measured. In a stable system, that time should be the RTT plus the queuing time in the network. However, as discussed above, estimates of the RTT can be indeterminate or inaccurate in some circumstances. Further, the queuing time in the network may be unknown. Target time estimation module 208 estimates a target time for a time interval to use in observing tuning data 202.

Target time estimation module 208 may take the estimate or measure of RTT 210 and multiply by a factor of two to provide margin in the case of long delay links. Max queue time 212 may be set to a predetermined value based on a selected tuning protocol, such as 100 ms based on tuning the Low Extra Delay Background Transport (LEDBAT) protocol in one illustrative example. This may be expressed as shown below in Equation (1):

$$TargetTime=2*RTT+MaxQueueTime \qquad (1)$$

Target time estimation module 208 computes RTT 210 and max queue time 212 to provide time interval 214, which is a target time estimate for the time interval to use in observing tuning data 202. In examples where it takes more than the target time to receive bytes at the receive buffer, the sender is considered to be slow, and the receive buffer size may be maintained. In other examples, where it takes more than the target time to receives bytes at the receive buffer, the receive buffer size may be increased if the round trip time was less than 2 RTT, even if the sender is considered slow. In examples where the sender is not slow, and the receive queue was not full, the average bytes received by individual time slices of time interval 214 may be compared to the max queue time 212 value, and the receive buffer size may be incremented as shown in the following logic:

If (average <0.5*max)
Increment by 100%
Else if (average <15/16 max)
Increment by 50%
Else
Increment by 6.25% (1/16).

If the time elapsed is less than the target time, the receive buffer size may also be compared to bandwidth delay product (BDP) predicted by a bandwidth estimation algorithm, using the following formula:

$$BDP=fudge*RTT*Bandwidth \qquad (2)$$

In Equation (2) above, the fudge factor is set to: 2 if the connection is in slow start; 2 if the connection is receive only; 1.25 in other cases. These values are exemplary, and other values are within the scope of the disclosure. If the computed receive buffer (RecBuf) is lower than BDP, the RecBuf value is set to BDP.

Auto-tuning component 114 observes tuning data 202 over the calculated time interval 214 and dynamically determines whether a receive buffer should be adjusted. If a determination is made that the receive buffer should be adjusted, auto-tuning component 114 may generate receive buffer instructions 216, which scalable auto-tune the receive buffer and correspondingly adjust a receive window of device 104 based on current conditions.

Observing tuning data 202 over the calculated time interval 214 may include measuring the minimum size of the receive buffer, or queue, over the time interval. If that minimum size is zero, or just a small fraction of the maximum size, it may be determined that the application is consuming data quickly and the value of the receive buffer may be increased. If that minimum size is close to the maximum buffer size, it may be determined that the application is unable to consume data at the rate it is being received (choking on data), and the value of the receive buffer may be reduced by a small amount relative to the current size of the receive buffer. If the minimum size of the receive buffer over the time interval is in between, not empty or full, or not close to the minimum or close to the maximum, the system may be considered to be at equilibrium and the buffer size may be maintained, or unchanged, in these examples.

The buffer size changes over time depending on when the application reads data and when data arrives. When the application is quickly consuming data the buffer will often be completely empty over an interval of time. When an application is stalled, or near stalled, the buffer may be quite full over the interval of time. When an application is consuming data at approximately the arrival rate, the queue may never be entirely empty nor entirely full.

Figure 3:
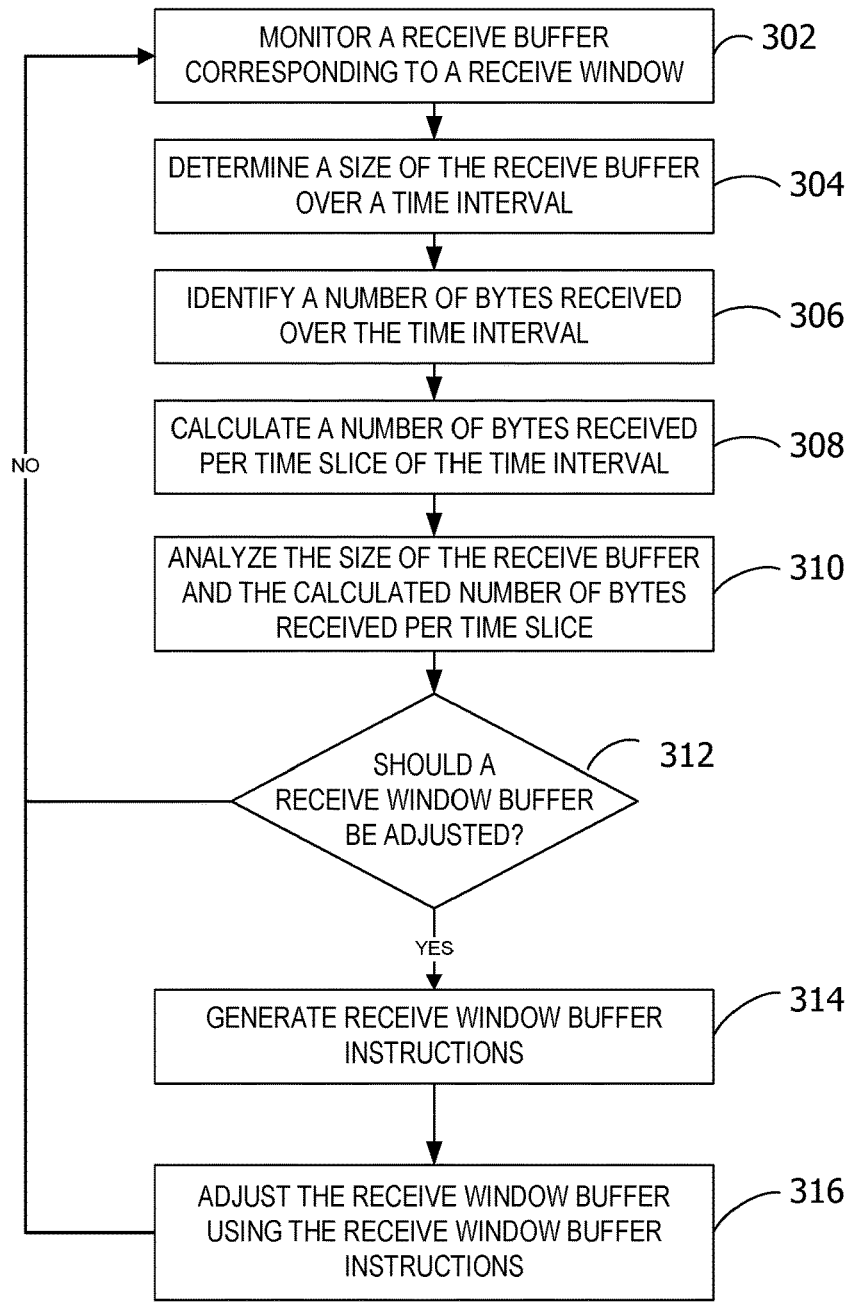
FIG. 3 is an exemplary flow chart illustrating operation of the scalable auto-tuning component to dynamically adjust a receive window buffer.

FIG. 3 is an exemplary flow chart illustrating operation of the scalable auto-tuning component, executed on a device, to dynamically adjust a receive window buffer for a network connection.

The process begins by monitoring a receive buffer at operation 302. The receive buffer may be monitored by an auto-tuning component implemented on a processor, such as auto-tuning component 114 in FIG. 1. The process determines a size of the receive buffer over a time interval at operation 304. The time interval may be selected by auto-tuning component 114, using a target time estimation module 208 in FIG. 2. The process identifies a number of bytes received over the time interval at operation 306. The process calculates a number of bytes received per time slice of the time interval at operation 308. The process analyzes the determined size of the receive buffer and the calculated number of bytes received per time slice for the time interval at operation 310.

At operation 312, the process determines whether a receive window buffer should be adjusted. If a determination is made that the receive window buffer should not be adjusted, the process returns to operation 302. If a determination is made that the receive window buffer should be adjusted, the process generates receive window buffer instructions at operation 314. The process adjusts the receive window buffer using the receive window buffer instructions at operation 316. The process may optionally scale a receive window provided at the receiving device based on the adjustment to the receive buffer.

The determination at operation 312 as to whether a receive window buffer should be adjusted is based on the observed tuning data for a time interval, such as tuning data 202 for time interval 214 in FIG. 2, for example. If the observed tuning data for a time interval indicates that a buffer is below a threshold range, the buffer may be decreased and the corresponding receive window tuned accordingly. If the observed tuning data for the time interval indicates that the buffer is above a threshold range, the buffer may be increased and the corresponding receive window tuned accordingly. If the observed tuning data for the time interval indicates that the buffer is substantially close to or within the threshold range, the buffer size may be maintained or remain unchanged.

Figure 4:
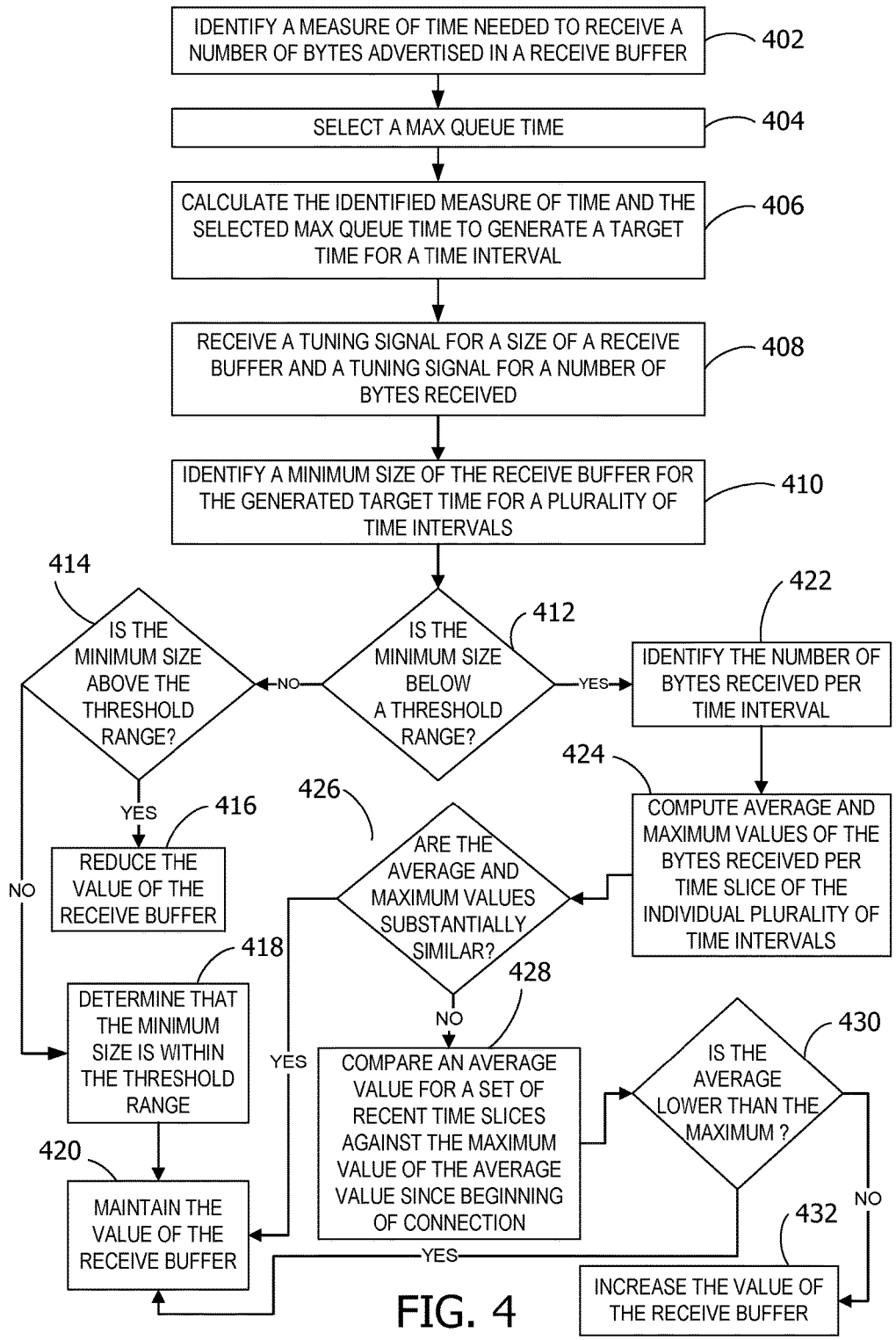
FIG. 4 is an exemplary flow chart illustrating operation of the scalable auto-tuning component to determine an adjustment type for the receive window buffer based on current conditions.

FIG. 4 is an exemplary flow chart illustrating operation of the scalable auto-tuning component to determine an adjustment type for the receive window buffer based on current conditions.

The process identifies a measure of time needed to receive a number of bytes advertised in a receive window at operation 402. The measure of time needed may be based on RTT and/or bandwidth. RTT and the bandwidth may be estimated using any suitable estimation algorithms. Various algorithms and techniques for estimating RTT are known in the art and therefore they will not be discussed in detail herein. The RTT may be estimated using known algorithms for this purpose or algorithms that are subsequently developed. The bandwidth for a connection may be estimated using an algorithm known as Adaptive Bandwidth Share Estimation (ABSE), or any other suitable algorithm.

The process selects a max queue time at operation 404, using an algorithm discussed above with regard to FIG. 2. The process calculates the identified measure of time and the selected max queue time to generate a target time for a time interval at operation 406. The process receives a tuning signal, or tuning data, for a size of a receive buffer and a tuning signal, or tuning data, for a number of bytes received at operation 408.

At operation 410, the process identifies a minimum size of the receive buffer for the generated target time for a plurality of time intervals. The process determines whether the minimum size of the receive buffer is below a threshold range at operation 412. The receive buffer size, or value, changes over time, depending on when the application reads data and when data arrives from a sender. When the application is quickly consuming data, the receive queue will often be completely empty at given points in time, or over a time interval. When an application is stalled, or almost stalled, the observed behavior may reflect a storage size, or queue, that is always substantially full. When the application is consuming data at approximately the arrival rate, the observed behavior may reflect a storage size, or queue, that is never entirely empty nor entirely full. This may provide the buffer size tuning data, such as buffer size 204 in FIG. 2, over a time interval. If that minimum buffer size is zero, or just a small fraction of the maximum size of the receive buffer, the process detects that the application is consuming data quickly, and may consider increasing the value of the receive buffer. If the minimum buffer size over the time interval is close to the maximum buffer size, the process detects that the application may be choking on data, and may consider reducing the value of the receive buffer by a small amount relative to the buffer size, such as 1/32th in one illustrative example. Where the minimum buffer size is in between, or within a pre-defined range between the minimum or substantially close to the minimum and the maximum or substantially close to the maximum, the process may detect that the system is at equilibrium and may maintain the buffer size, or buffer value, and therefore the receive buffer may remain unchanged.

If a determination is made that the receive buffer size is below a threshold range, the process determines whether the minimum size of the receive buffer is above the threshold range at operation 414. If a determination is made that the minimum size of the receive buffer is above the threshold range, the process may reduce the value of the receive buffer at operation 416. If a determination is made that the minimum size of the receive buffer is not above the threshold range, the process determines that the minimum size is within the threshold range at operation 418, and maintains the value of the receive buffer at operation 420.

If a determination is made at operation 412 that the minimum size of the receive buffer over a time interval is below a threshold range, the process identifies the number of bytes received per time interval at operation 422. If the application is consuming data quickly, and the process detects that the minimum receive buffer over the time interval is small, the receive buffer value may be increased. However, there may be a condition where the sender is sending at line speed and the application is immediately consuming all the received data. In this example, where the sender is sending at line speed, there is no need to increase a receive buffer any further. To determine whether the sender is sending at line speed, the process observes how the amount of bytes received per time slice varies during the last time interval.

If the sender is sending at line rate, a behavior is observed where almost all samples are at or near the maximum possible value. To test this, the process may compute the average value of bytes received for recent slices of time for a given time interval against the maximum values of the bytes received by time slice values over the given time interval. If the average and the maximum are almost the same, the sender is sending at line speed, and there is no need to increase the buffer. Or optionally, the buffer may be increased by a substantially small amount, relative to the size of the existing buffer for example. If the average is lower than the maximum, the buffer may be increased, substantially rapidly if the average is much lower than the max, more slowly if the average is closer to the max. As used herein, recent may refer to the immediately preceding one or more time slices for a given time interval.

There may be some examples where the sender does not have much data to send, in which case the average value of the most recent time slices may be lower than the maximum average value since the beginning of the connection, which may lead to incrementing the receive buffer when it is not needed. In order to address this scenario, the effective bandwidth of the sender may be compared to the available bandwidth to determine if the average value of the recent time slices is lower than the maximum average value since the beginning of the connection due to the amount of data the sender has to send.

At operation 424, the operation computes the average and maximum values of the bytes receive per time slice of the individual plurality of time intervals. The process determines whether the average and maximum values are substantially similar at operation 426. If a determination is made that the values are substantially similar, the process proceeds to maintain the value of the receive buffer at operation 420. If a determination is made that the values are not substantially similar, the process compares an average value for a set of recent time slices against the maximum value of the average value since the beginning of the connection at operation 428. Comparing the average value of bytes received for recent slices of time for the given time interval against the maximum of the average value since the beginning of the connection provides insight into whether the dissimilarity between the computed average and maximum values for the time interval is due to the receive window being too small or an application at the sender having no need to send data at a high rate or having a small amount of data to send.

The process determines if the average value of the set of recent time slices is lower than the maximum value of the computed average value over the time interval at operation 430. If a determination is made that the average is lower than the maximum, the process may proceed to operation 420 and maintain the value of the receive buffer, because the system understands there is no need to increase the receive window. If a determination is made that the average is not lower than the maximum, the process increases the value of the receive buffer at operation 432.

Figure 5A:
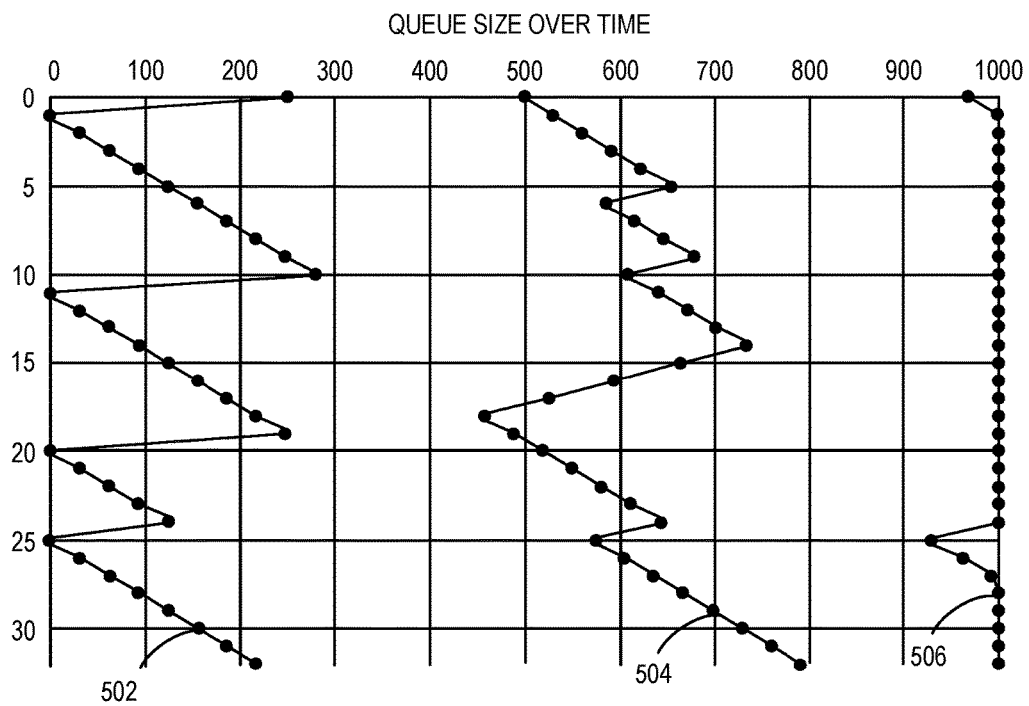
FIG. 5A is an exemplary graph of a receive buffer size over a time interval.

FIG. 5A is an exemplary graph of a receive buffer size over a time interval. The exemplary graph presented in FIG. 5A may represent a tuning signal, or tuning data, of a receive buffer size over time, such as buffer size 204 in FIG. 2.

The buffer size changes over time, depending on when the application reads data and when data arrives. The exemplary graph in FIG. 5A illustrates three hypothetical variations.

When the application is quickly consuming data, a behavior may be observed similar to curve 502, where the queue will often be completely empty. When the application is almost stalled, a behavior will be observed similar to curve 506, where the queue is always quite full. When the application is consuming data at approximately the arrival rate, a behavior may be observed similar to curve 504, in which the queue is never entirely empty nor entirely full.

Figure 5B:
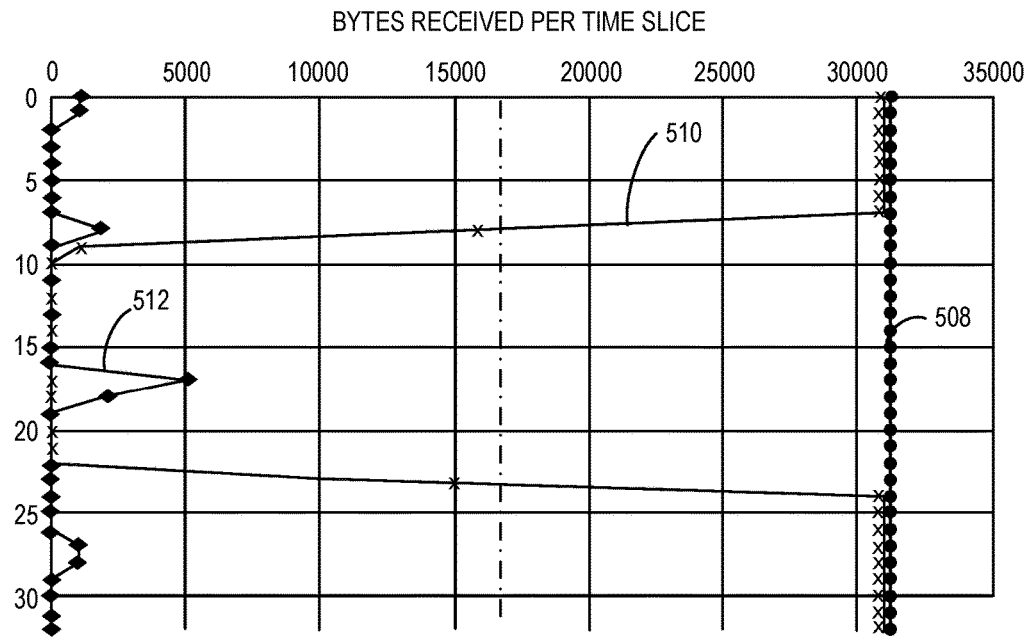
FIG. 5B is an exemplary graph of a distribution rate over a time interval.

FIG. 5B is an exemplary graph of a distribution rate over a time interval. The exemplary graph presented in FIG. 5B may represent a tuning signal of data distribution over time, such as packet distribution 206 in FIG. 2.

In this illustrative example, if the sender is sending at line rate, a behavior will be observed similar to line 508, where almost all samples are at or near the maximum possible value. On the other hand, if the sender is sometimes blocked because the receive window is too small, a behavior will be observed similar to line 510, where some time slices will contain fewer bytes than the maximum over the observed time interval. To test this, the auto-tuning component may compute the average and the maximum values of the bytes received by time slice for a time interval. If the average and the maximum are almost the same, as in the line 508, the component considers that the sender is sending at line speed, and the buffer does not need to be adjusted or increased, or may be only marginally increased in some illustrative examples. If the average is lower than the maximum, a determination may be made to increase the buffer, rapidly if the average is much lower than the max, more slowly if the average is closer to the max.

Senders may not constantly send at maximum rate. There may be cases where the sender does not have much data to send, as is illustrated by line 512. The average value of line 512 is lower than the maximum value, and if that was the only factor considered, the system may still increment the receive buffer un-necessarily. To account for this, the system compares the effective bandwidth of the sender to the available bandwidth to determine where the sender does not have much data to send and the receive buffer may be maintained at current values.

Figure 6:
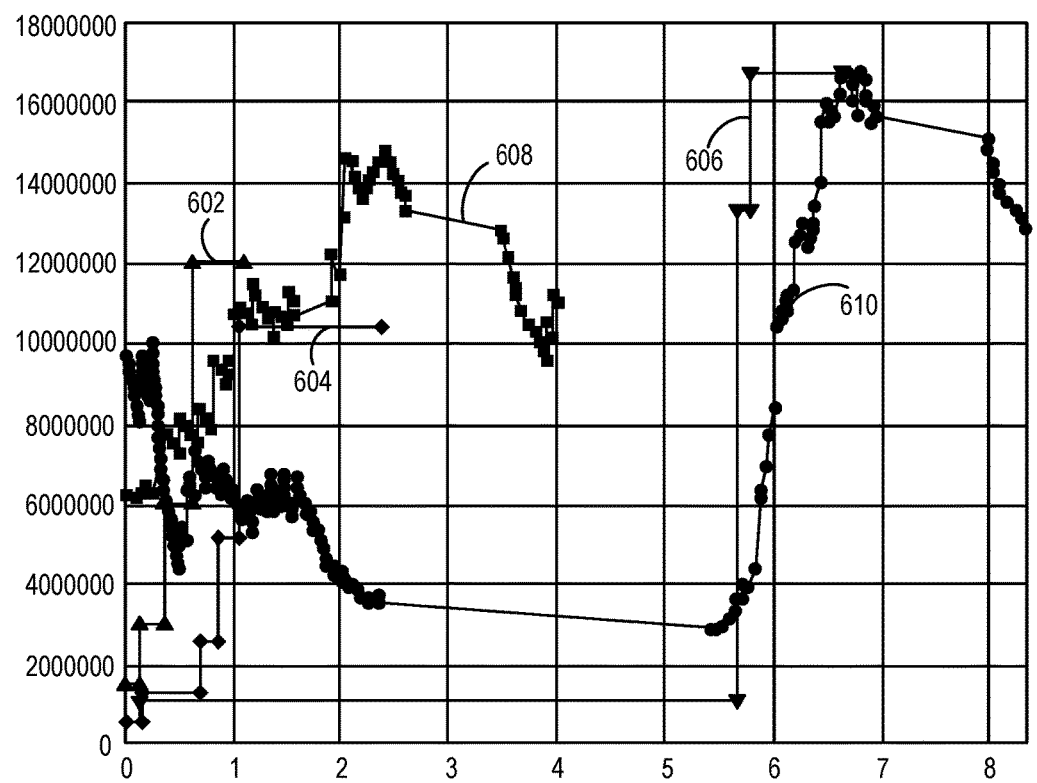
FIG. 6 is an exemplary graph of a comparison between a scalable receive window auto-tuning operation and a current auto-tuning operation.

FIG. 6 is an exemplary graph of a comparison between a scalable receive window auto-tuning operation and a current auto-tuning operation. Lines 602, 604, and 606 correspond to the behavior of the scalable receive window auto-tuning as described herein. Lines 608 and 610 correspond to the behavior of the auto-tuning algorithm in current versions of Windows® operating system, such as Windows® operation system versions 7, 8, 8.1 or 10. The conditions were different in each test, but lines 602 and 604 have similar conditions to line 608, while line 606 has similar conditions to line 610.

Additional Examples

In some examples, the system uses the bandwidth estimator, which itself has a dependency on RTT measurement. The bandwidth estimator uses a form of "packet pair" algorithm, measuring the peak amount of data sent over a fraction of the RTT. This is the justification for the "bucket" algorithm. In some other examples, the system may run the code on a timer, so it adapts always, even if the bandwidth estimation is turned off.

Alternatively, or in addition to the other examples described herein, examples include any combination of the following:
wherein the processor further executes instructions to determine the size of the receive buffer over the time interval, including to identify a number of bytes in the receive buffer per time slice of the time interval;
wherein the processor further executes instructions to determine the size of the receive buffer over the time interval, including to identify a minimum size of the receive buffer at individual time slices of the one or more time slices of the time interval;
wherein the processor further executes instructions to calculate the number of bytes received per time slice of the time interval, including to identify a variance between the number of bytes received for individual time slices of the one or more time slices;
wherein the processor further executes instructions to calculate a target time for the time interval;
wherein the processor further executes instructions to adjust the receive buffer based on a scaling factor;
wherein the scaling factor is based at least in part on a minimum size of the receive buffer over the time interval;
wherein the scaling factor is based at least in part on a threshold range for a receive buffer;
wherein the scaling factor is based at least in part on a computed average value and maximum value of bytes received per time slice of the one or more time slices of the time interval, and determining whether the computed average value of the set of recent time slices is lower than the computed maximum value of the average value for the time interval;
identifying a measure of time needed to receive a number of bytes advertised in a receive buffer;
selecting a max queue time;
calculating the identified measure of time and the selected max queue time to generate the target time value for the time interval;
receiving tuning data for a size of a receive buffer over the time interval;
receiving tuning data for a number of bytes received over the time interval;
identifying a minimum size of the receive buffer for the generated target time value for a plurality of time intervals;
determining whether the minimum size of the receive buffer is below a threshold buffer size range;
responsive to a determination that the minimum size is below the threshold buffer size range, identifying the number of bytes received per time interval;
computing an average value and a maximum value of the bytes received per time slice of an individual time interval;
determining whether the average and maximum values are substantially similar;
responsive to a determination that the average and maximum value are substantially similar, maintaining the value of the receive buffer;
responsive to a determination that the average and maximum values are not substantially similar, determining whether the average value is lower than the maximum value;
responsive to a determination that the average value is lower than the maximum value, increasing the value of the receive buffer;
responsive to a determination that the minimum size is not below the threshold buffer size range, determining if the minimum size is above the threshold buffer size range;

responsive to a determination that the minimum size is above the threshold buffer size range, reducing the value of the receive buffer;

responsive to a determination that the minimum size is not above the threshold buffer size range, considering that that minimum size is within the threshold buffer size range and maintaining the value of the receive buffer;

receiving tuning data for a size of a receive queue;

receiving tuning data for a number of bytes received.

In some examples, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 7:
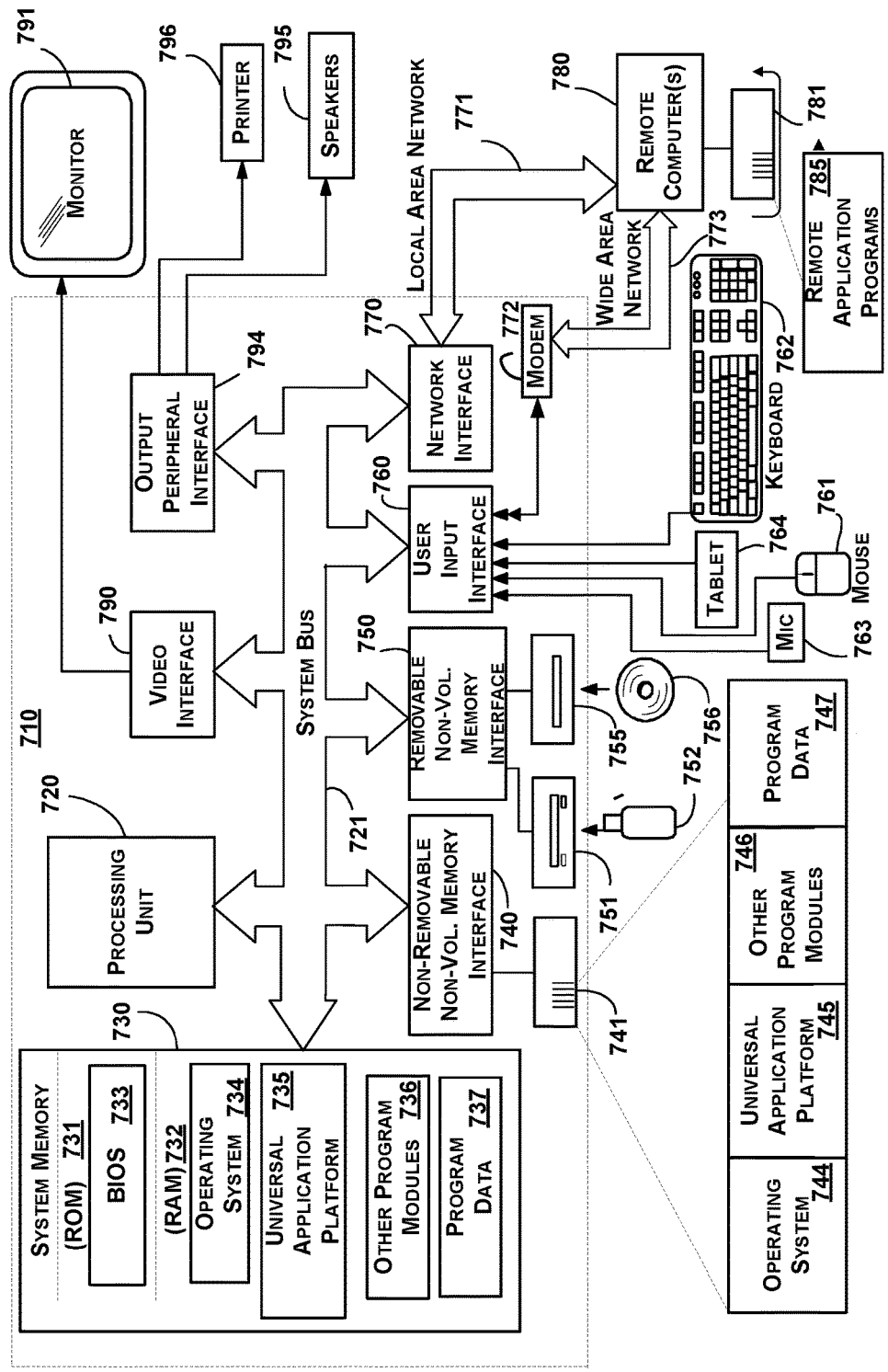
FIG. 7 is an exemplary block diagram illustrating an operating environment for a computing device implementing remote activation of development capabilities for a secure device.

FIG. 7 illustrates an example of a suitable computing and networking environment 700 on which the examples of FIG. 1 and FIG. 2 may be implemented. The computing system environment 700 is only one example of a suitable computing environment and is not intended to suggest any limitation as to the scope of use or functionality of the disclosure. Neither should the computing environment 700 be interpreted as having any dependency or requirement relating to any one or combination of components illustrated in the exemplary operating environment 700.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 7, an exemplary system for implementing various aspects of the disclosure may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 731 and 732 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 710. Computer storage media does not, however, include propagated signals. Rather, computer storage media excludes propagated signals. Any such computer storage media may be part of computer 710.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs, such as universal application platform 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a universal serial bus (USB) port 751 that provides for reads from or writes to a removable, nonvolatile memory 752, and an optical disk drive 755 that reads from or writes to a removable, nonvolatile optical disk 756 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and USB port 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, universal application platform 745, other program modules 746 and program data 747. Note that these components may either be the same as or different from operating system 734, universal application platform 735, other program modules 736, and program data 737. Operating system 744, universal application platform 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel may be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

The examples illustrated and described herein as well as examples not specifically described herein but within the scope of aspects of the disclosure constitute exemplary means for scalable window receive auto-tuning. For example, the elements illustrated in FIG. 1 and FIG. 2, such as when encoded to perform the operations illustrated in FIG. 3 and FIG. 4, constitute exemplary means for calculating a target time for a time interval, receiving a plurality of tuning signals corresponding to a receive window, exemplary means for observing the plurality of tuning signals according to the time interval based on the calculated target time, and exemplary means for determining whether to adjust a receive buffer based on observed behavior of the plurality of tuning signals over the time interval.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system comprising:
   at least one processor; and
   a memory communicatively coupled to the at least one processor,
   the processor executing instructions stored on the memory to:
      monitor a receive buffer of a receive window for a network connection;

determine a size of the receive buffer over a time interval, the time interval having one or more time slices;

identify a number of bytes received over the time interval via the network connection;

calculate a number of bytes received per time slice for the time interval; and analyze the determined size of the receive buffer over the time interval and the calculated number of bytes received per time slice of the time interval to determine whether to adjust the receive buffer for scalable auto-tuning of the receive window for the network connection.

2. The system of claim 1, wherein the processor further executes instructions to determine the size of the receive buffer over the time interval, including to identify a number of bytes in the receive buffer per time slice of the time interval.

3. The system of claim 1, wherein the processor further executes instructions to determine the size of the receive buffer over the time interval, including to identify a minimum size of the receive buffer at individual time slices of the one or more time slices of the time interval.

4. The system of claim 1, wherein the processor further executes instructions to calculate the number of bytes received per time slice of the time interval, including to identify a variance between the number of bytes received for individual time slices of the one or more time slices.

5. The system of claim 1, wherein the processor further executes instructions to calculate a target time for the time interval.

6. The system of claim 1, wherein the processor further executes instructions to adjust the receive buffer based on a scaling factor.

7. The system of claim 6, wherein the scaling factor is based at least in part on a minimum size of the receive buffer over the time interval.

8. The system of claim 6, wherein the scaling factor is based at least in part on a threshold range for a receive buffer.

9. The system of claim 6, wherein the scaling factor is based at least in part on comparing a computed average value of a set of recent time slices of the one or more time slices against a computed maximum value of an average value of bytes received per time slice of the one or more time slices of the time interval, and determining whether the computed average value of the set of recent time slices is lower than the computed maximum value of the average value for the time interval.

10. A method for scalable receive window auto-tuning for a network connection, the method comprising:

calculating a target time value for a time interval, the target time value calculated based on a number of bytes advertised in a receive buffer, including by:

identifying a measure of time needed to receive the number of bytes advertised in the receive buffer;

selecting a max queue time; and calculating the identified measure of time and the selected max queue time to generate the target time for the time interval;

receiving tuning data corresponding to a receive window;

observing the tuning data during the time interval based on the calculated target time value;

adjusting the receive buffer value responsive to determining that the receive buffer is below or above a threshold range based on observed behavior of the tuning data over the time interval; and maintaining the receive buffer value responsive to determining that the receive buffer is within the threshold range.

11. The method of claim 10, wherein the adjusting the receive buffer value includes adjusting the receive buffer based on a scaling factor.

12. The method of claim 10, wherein receiving the tuning data further comprises:

receiving tuning data for a size of a receive buffer over the time interval; and receiving tuning data for a number of bytes received over the time interval.

13. The method of claim 10, wherein adjusting the receive buffer further comprises:

identifying a minimum size of the receive buffer for the generated target time for a plurality of time intervals.

14. The method of claim 13, further comprising:

determining whether the minimum size of the receive buffer is below a threshold buffer size range;

responsive to a determination that the minimum size is below the threshold buffer size range, identifying the number of bytes received per time interval; and computing an average value and a maximum value of the bytes received per time slice of an individual time interval.

15. The method of claim 14, further comprising:

determining whether the average and maximum values are substantially similar;

responsive to a determination that the average and maximum value are substantially similar, maintaining the value of the receive buffer;

responsive to a determination that the average and maximum values are not substantially similar, comparing an average value for a set of recent time slices against the maximum value for the time interval;

determining whether the average value for the set of recent time slices is lower than the maximum value;

responsive to a determination that the average value is lower than the maximum value, maintaining the value of the receive buffer; and responsive to a determination that the average value is higher than the maximum value, increasing the value of the receive buffer.

16. The method of claim 14, further comprising:

responsive to a determination that the minimum size is not below the threshold buffer size range, determining if the minimum size is above the threshold buffer size range;

responsive to a determination that the minimum size is above the threshold buffer size range, reducing the value of the receive buffer; and responsive to a determination that the minimum size is not above the threshold buffer size range, considering that that minimum size is within the threshold buffer size range and maintaining the value of the receive buffer.

17. One or more computer storage device having computer-executable instructions stored thereon for scalable window receive auto-tuning, which, on execution by a computer, cause the computer to perform operations comprising:

calculating a target time value for a time interval, including by identifying a measure of time needed to receive a number of bytes advertised in a receive buffer, selecting a max queue time, and calculating the identified measure of time and the selected max queue time to generate the target time for the time interval;

receiving a plurality of tuning data corresponding to a receive window;

observing the plurality of tuning data during the time interval based on the calculated target time value;

adjusting a receive buffer value associated with the receive window in response to a determination that the receive buffer is below or above a threshold range based on observed behavior of the plurality of tuning data over the time interval; and maintaining the receive buffer value in response to a determination that the receive buffer is within the threshold range.

18. The one or more computer storage device of claim 17, wherein calculating the target time for the time interval further comprises:

determining whether the minimum size of the receive buffer is below a threshold buffer size range;

responsive to a determination that the minimum size is below the threshold buffer size range, identifying the number of bytes received per time interval; and computing an average value and a maximum value of the bytes received per time slice of an individual time interval.

19. The one or more computer storage device of claim 17, wherein receiving the plurality of tuning data further comprises:

receiving tuning data for a size of a receive queue; and receiving tuning data for a number of bytes received.

20. The one or more computer storage device of claim 17, wherein adjusting the receive buffer further comprises:

identifying a minimum size of the receive buffer for the generated target time for a plurality of time intervals.

* * * * *